United States Patent Office 3,369,397
Patented Feb. 20, 1968

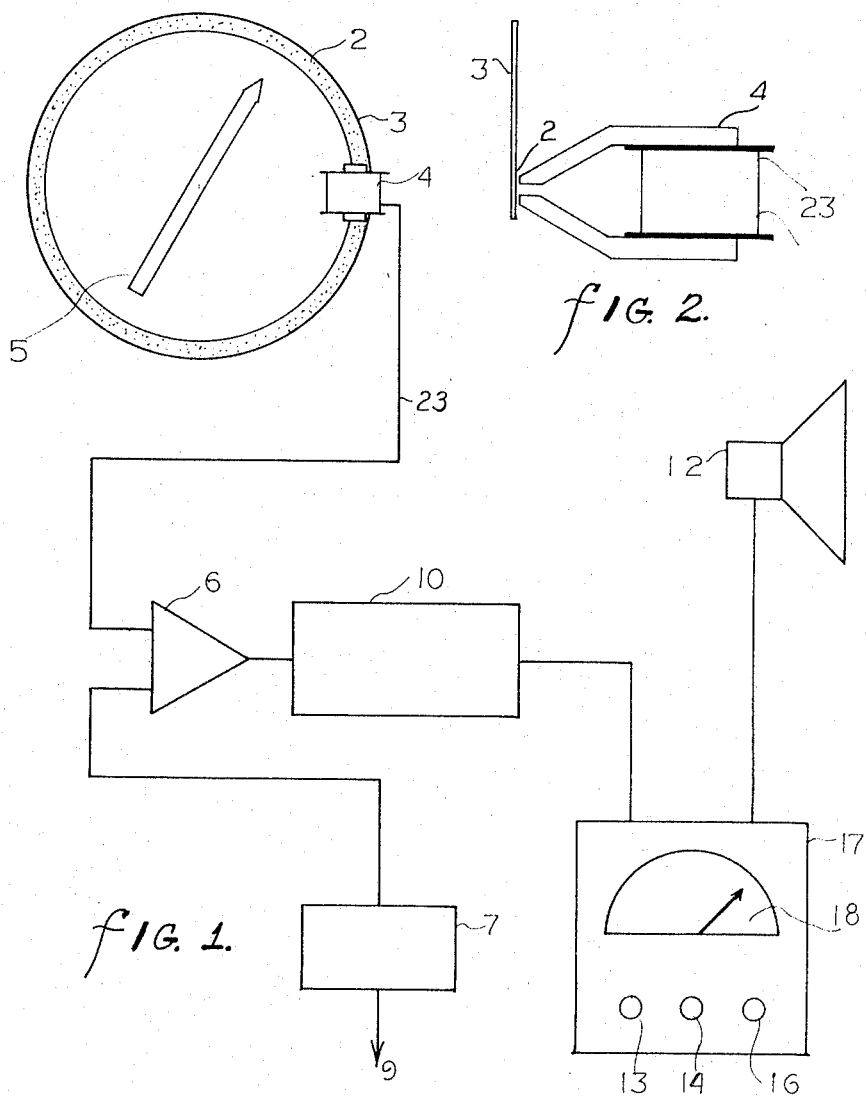

3,369,397
RATE OF CLIMB INDICATOR
Max Alth, 6 Tamarack Road, Port Chester, N.Y. 10573
Filed Jan. 26, 1966, Ser. No. 523,219
4 Claims. (Cl. 73—179)

ABSTRACT OF THE DISCLOSURE

A disc incorporating magnetized particles is mounted on the shaft of the pointer used in an altimeter. Changes in altitude cause both the pointer and the disc to rotate. Rotation induces a voltage in a nearby coil. Amplitude and frequency of generated signal is proportional to disc r.p.m. and thus to vertical velocity. Signal amplitude is read out on a meter calibrated in feet per minute. Frequency is converted to an audible signal to keep the pilot aware of his vertical velocity without necessitating his visual attention.

---

The present invention provides a device which informs the pilot of an aircraft both visually and aurally that he is ascending or descending, and his vertical rate of speed.

The present invention provides the pilot of an aircraft with a device which displays rate of climb on a choice of scales, i.e., in feet per second, feet per minute, or hundreds of feet per minute. The choice of scales can be made by means of an electric switch.

The present invention eliminates the present mechanical method which utilizes a "leaky bellows" system wherein an aneroid bellows having a predetermined opening is connected by mechanical means to a dial indicator.

The present invention provides a means whereby the pilot can quickly test his instrument to determine whether or not it is operating, and whether or not it is correctly calibrated.

The present invention provides a rate of climb indicator which is inherently more accurate and reliable than the forementioned leaky bellows device.

FIGURE 1 illustrates the various components comprising my invention.

FIGURE 2 is a side view of the pickup coil used in this invention.

In FIGURE 1, 2 is a layer of magnetized iron particles which are bonded to non-metallic disc 3. The disc is mounted on the same shaft that carries the altitude indicating pointer of a standard aneroid altimeter. The pickup coil and iron core 4 is similar to that used to pickup electrical signals from magnetic tape recordings.

Lead(s) 23 connect the pickup coils with amplifier 6, which in turn is connected to attenuator 10 and thence to 17, the display meter and controls. Control 13 varies the amount of amplification. Control 14 is used to introduce an accurate, fixed and known voltage into the circuits for the purpose of testing. Control 16 is used to vary the sound produced by loud speaker 12. The AC voltmeter, calibrated in feet per second, is marked 18. The power supply is 7, and line 9 leads to the craft's battery.

FIGURE 2 is an enlarged view of the pickup coil and a portion of the disc carrying the magnetized iron particles. Part numbers remain the same.

The operational theory of the new rate of climb indicator is neither new nor complicated. The invention is based on the fact that rate of climb, i.e. vertical velocity, is a function of altitude change versus time and is presently displayed by the small-unit pointer on every standard aneroid altimeter whenever the carrying aircraft changes altitude.

When an aircraft moves from a 1,000 ft. altitude to a 5,000 ft. altitude the altitude pointer on the aircraft's pointer makes a number of turns. The rate at which this pointer moves is literally the aircraft's rate of climb or vertical velocity. All one needs to do is to measure the r.p.m. of this pointer and convert the r.p.m. to vertical velocity.

In the preferred embodiment of this invention the r.p.m. of the altitude-indicating needle of an altimeter is measured by mounting a non-metallic disc 3 on the pointer's 5 shaft. The disc 3 carrier a layer of magnetized iron particles 2, near which a pickup coil means 4 is mounted. When the magnetized particles go past the poles of the pickup means a voltage is generated in the coil. The generated voltage is directly proportional to the speed of the disc which in turn is directly responsive to altitude changes as evidenced by movement of the altimeter's indicating pointer.

The voltage so generated is fed into an amplifier 6 and thence into an attenuator 10 and then to readout meter 18, contained in unit 17.

Obviously the greater the vertical velocity of the aircraft the faster the disc will turn and the greater the voltage generated. When the aircraft is maintaining level flight, no voltage is generated in coil 4 and the indicator remains at center position or zero.

To increase the range presented by meter 18, control 13 is provided. This control varies amplification in a series of calibrated steps. Obviously the greater the amplification the more sensitive the system and vice versa. If pointer 5 and associated disc 3 were to make one revolution per minute, which might indicate an altitude change of 100 ft. and thus a verticle velocity of 100 ft. per minute, and if meter 18 and associated circuitry were calibrated to provide full-scale indication at this speed, a reduction of amplification by a factor of 10:1 would convert full scale reading from 100 ft./min. to 1000 ft./min. Conversely, increasing amplification would make full-scale indication equal to 10 ft./min.

Control 14 introduces a pre-set, known and accurate test voltage. Assume that 10 microvolts across the pickup coil provides full-scale reading with control 13 in its highest gain position. Using control 14 to introduce a test voltage when the plane is at rest would be an easy means for the pilot to quickly test the instrument. If the scale did not go to full with the test voltage, something obviously would be defective.

The frequency of the voltage produced by the rotation of disc 3 past the pickup means will vary directly with the disc's speed of rotation. The greater the aircraft's vertical velocity, the higher the frequency of the signal generated.

A portion of the voltage so generated is amplified and supplied to speaker 12. Control 16 is used to vary the volume of sound produced.

With the present invention a pilot can listen to his VV and maintain a desired rate of descent without taking his eyes from the landing strip—a tremendous aid to safety in landing.

The amplifier 6 is supplied with a constant voltage by means of power supply 7, which contains a storage battery and standard electrical elements to maintain a fixed output voltage despite power failure and variations in input power supplied by the aircraft's electrical system.

Having described my invention and its manner of manufacture, this is what I claim as new and novel and desire to secure by Letters Patent:

1. A rate of climb indicating device for an aircraft comprising an aneroid altimeter having a shaft which turns the altimeter's indicating pointer; a nonmetallic disc fixed to said shaft; a layer of magnetic particles coating the periphery of said disc, and having applied thereto a cyclically varying signal; a magnetic pickup mounted adjacent to said layer such that when said pointer rotates in response to a change in altitude, said disc rotates with it and includes in said pickup an alternating current the frequency of which is related to the speed of disc rotation and to the rate of change in altitude; amplifier means for amplifying said alternating current; a frequency meter responsive to the frequency of said amplified current to indicate rate-of-climb; and a loudspeaker also responsive to said amplified current to give an audible signal, the tone of which varies directly with the rate of climb.

2. A rate of climb indicating device as in claim 1 in which the gain of said amplifier means may be varied in discrete accurate steps to vary the intensity of the audible signal in said loudspeaker.

3. A rate of climb indicating device as in claim 1 in which said amplifier means, said frequency meter, and loudspeaker have a power supply separate from the aircraft's power supply and comprising a rechargeable battery and active solid state elements.

4. A rate of climb indicating device as in claim 1 including a source of alternating voltage having a known voltage and frequency, a switch to introduce this output into the pickup coil circuit, whereby the condition of the device may be tested while the aircraft is at rest.

References Cited
UNITED STATES PATENTS

| | | | |
|---|---|---|---|
| 2,358,571 | 9/1944 | Hall | 73—179 X |
| 3,206,975 | 9/1965 | Elwell et al. | 73—179 |
| 3,237,452 | 3/1966 | Alth | 73—179 |

LOUIS R. PRINCE, *Primary Examiner.*

N. B. SIEGEL, *Assistant Examiner.*